US006824347B2

(12) United States Patent
Maloney (10) Patent No.: US 6,824,347 B2
(45) Date of Patent: Nov. 30, 2004

(54) VALVE AND RELATED METHODS FOR REDUCING FLUID PRESSURE AND GENERATING POWER

(76) Inventor: Michael A. Maloney, 13322 187th Ct. NE., Woodinville, WA (US) 98072

( * ) Notice: Subject to any disclaimer, the term of this patent is extended or adjusted under 35 U.S.C. 154(b) by 80 days.

(21) Appl. No.: 10/334,510

(22) Filed: Dec. 30, 2002

(65) Prior Publication Data

US 2004/0126223 A1 Jul. 1, 2004

(51) Int. Cl.$^7$ .............................................. F01D 17/08
(52) U.S. Cl. ...................... 415/1; 415/202; 415/149.1; 415/151; 415/26
(58) Field of Search ......................... 415/149.1, 149.2, 415/202, 151, 167, 261, 1, 26; 416/44, 178, 187, 197 A, 197 R (56) References Cited

U.S. PATENT DOCUMENTS

| | | | | |
|---|---|---|---|---|
| 547,667 A | * | 10/1895 | Kales | 415/198.1 |
| 642,067 A | * | 1/1900 | Bash et al. | 415/201 |
| 1,352,588 A | * | 9/1920 | Egedi | 415/122.1 |
| 2,663,541 A | * | 12/1953 | Geen | 415/185 |
| 2,733,044 A | * | 1/1956 | Danel | 239/583 |
| 4,142,367 A | | 3/1979 | Guisti | |
| 4,220,009 A | | 9/1980 | Wenzel | |
| 4,246,753 A | | 1/1981 | Redmond | |
| 4,355,949 A | * | 10/1982 | Bailey | 415/35 |
| 4,387,575 A | | 6/1983 | Wenzel | |
| 4,488,055 A | | 12/1984 | Toyama | |
| 4,746,808 A | | 5/1988 | Kaeser | |
| 4,950,130 A | | 8/1990 | Erlach | |
| 5,555,728 A | | 9/1996 | Welch, Jr. | |
| 5,606,858 A | | 3/1997 | Amir et al. | |
| 5,628,191 A | | 5/1997 | Kueck et al. | |
| 5,685,154 A | | 11/1997 | Bronicki et al. | |

FOREIGN PATENT DOCUMENTS

| | | |
|---|---|---|
| EP | 1 126 089 A2 | 8/2001 |
| GB | 2225813 A | 6/1990 |
| WO | PCT/US03/40609 | 6/2004 |

OTHER PUBLICATIONS

Inside CLA–VAL Co. Automatic Control Valves, CLA–VAL, 1992.
Pressure Reducing Valve, Model 90–01 690–01, CLA–VAL, Product Catalogue, 1997.
Hydropwer, Cismac Electronique, 2002, Webpage url http://www.cismac.com/hydropower_us.html.
Company website, url http://www.internalcommand.com/tech_broc.html, Internal Command International, 2002.

* cited by examiner

Primary Examiner—Ninh H. Nguyen
(74) Attorney, Agent, or Firm—Graybeal Jackson Haley LLP (57) ABSTRACT

A valve for reducing fluid pressure in a fluid distribution network uses the energy released from the fluid to generate power. The valve includes a housing, a turbine disposed within the housing, a fluid reservoir, and a flow control device operable to generate a turbine inlet flow having a flow velocity from an inlet flow having a fluid pressure. The turbine receives the turbine inlet flow, which rotates the turbine to generate power. The fluid reservoir collects the flow of fluid discharged from the turbine and generates a valve discharge flow having a desired fluid pressure that is less than the fluid pressure of the inlet fluid. Thus, the energy from the inlet flow is used to generate power. Furthermore, the power generated by the turbine can be independent of the fluid pressure of the valve discharge flow. Consequently, the valve can provide a consistent reduction in fluid pressure and/or flow rate in a distribution network while the turbine generates power.

49 Claims, 4 Drawing Sheets

VALVE AND RELATED METHODS FOR REDUCING FLUID PRESSURE AND GENERATING POWER

BACKGROUND

Fluid distribution networks are used in a variety of applications to distribute fluid from a central reservoir to one or more remote locations where the fluid is available for use. Typically one or more main transmission lines convey the fluid from the reservoir to one or more branch transmission lines that, in turn, convey the fluid to a respective one or more remote locations. Because most remote locations are designed to operate with a fluid having specific flow characteristics such as pressure and/or flow rate, the fluid-distribution network is designed to distribute more fluid than all the remote locations can simultaneously consume. Furthermore, the fluid distribution network is designed to provide the maximum amount of fluid at a pressure significantly higher than the highest design pressure of all the remote locations. Consequently, fluid-distribution networks typically include pressure-reducing valves to reduce the pressure and flow rate of the fluid before the fluid reaches the remote locations.

For example, a typical water-distribution system used by a city to supply water for commercial and residential use includes one or more main water lines that convey water from a local reservoir or pump station to zones within the city. Each zone typically includes a secondary water line that conveys the water from the main lines to neighborhoods within the zone. And each neighborhood typically includes a consumer distribution line that conveys the water from the secondary lines to the individual consumers within the neighborhood. The design pressure of the fluid received by the individual consumer is typically 40 pounds per square inch (psi) while the design pressure of the fluid in the main water lines is typically 300 psi. Consequently, pressure reducing valves are typically placed at the junctions of the main and secondary water lines and at the junctions of the secondary water lines and the the consumer distribution lines. Pressure reducing valves, however, may also be placed within the main, secondary or consumer distribution lines.

Figure 1:
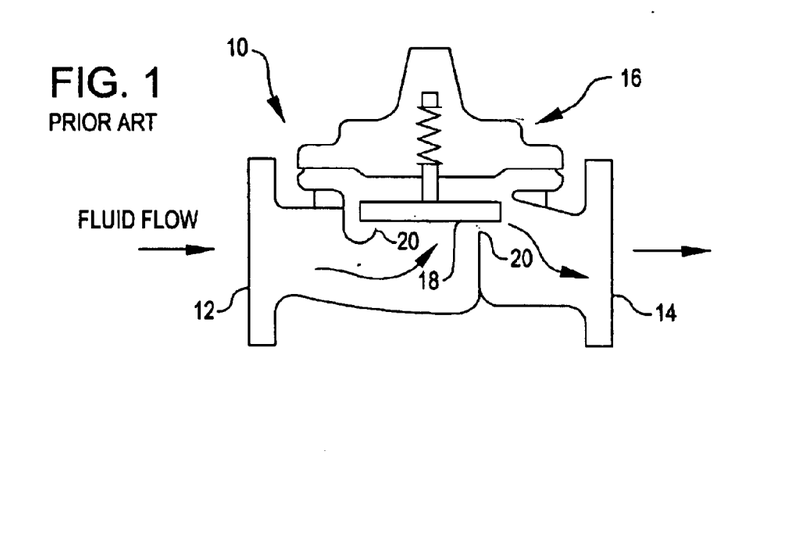
FIG. 1 is a cut-away view of a conventional valve for reducing fluid pressure.

FIG. 1 is a cut-away view of a conventional pressure reducing valve 10 incorporated in a typical fluid distribution network (omitted from FIG. 1 for clarity). The valve 10 includes an inlet portion 12 for receiving fluid having an inlet pressure, an outlet portion 14 for discharging fluid having a discharge pressure that is less than the inlet pressure, and a gate assembly 16 for regulating the amount of fluid allowed to flow from the inlet portion 12 to the outlet portion 14. The gate assembly 16 includes a piston 18 that can be moved relative to a piston seat 20 to increase or decrease the amount of fluid allowed to flow from the inlet portion 12 to the outlet portion 14. Even when the piston 18 is fully open, the amount of fluid allowed to flow into the outlet portion 14 is less than the amount of fluid that would normally flow through a transmission line without the valve 10. As the piston 18 closes, (moves toward the seat 20) the amount of fluid allowed to flow into the outlet portion 14 from the inlet portion 12 is reduced even further. Consequently, the valve 10 reduces the pressure of the fluid flowing out of the outlet portion 14 by reducing the amount of fluid flowing through the valve 10.

Because the valve 10 reduces the amount of fluid flowing from the inlet portion 12 to the outlet portion 14, the inlet pressure causes the flow velocity of the fluid flowing between the piston 18 and the piston seat 20 to increase with respect to the velocity of the fluid into the inlet portion 12. The flow velocity, and thus the flow energy of the fluid discharged from the outlet 14 is then reduced by turbulence that is generated within the flow as the fluid flows away from the valve 10, by changes in the direction of the flow as the fluid proceeds through the network, and by friction between the interior walls of the transmission lines and the fluid.

Unfortunately, reducing the flow velocity by these means does not allow one to capture the energy released from the flow in a readily usable form. If the fluid-distribution network includes many valves for reducing pressure, the total amount of energy released by the aggregate pressure reduction can be significant.

In view of the foregoing, there is a need for a valve that can reduce fluid pressure and use the released energy to generate power.

SUMMARY

In one aspect of the invention, a valve for reducing fluid pressure uses the energy released from the fluid to generate power. The valve includes a housing, a turbine disposed within the housing, a valve outlet, and a flow control device operable to generate a turbine inlet flow having a flow velocity from an inlet flow having a fluid pressure. The turbine receives the turbine inlet flow, which rotates the turbine to generate power. The valve outlet discharges fluid having a desired fluid pressure that is less than the fluid pressure of the inlet flow. Thus, the pressure removed from the inlet flow releases energy that is used to generate power. Furthermore, the power generated by the turbine can be independent of the pressure of the fluid discharged from the valve. Consequently, the valve can provide a desired reduction in fluid pressure and/or flow rate while the turbine generates power. To convert this power to electricity, one can drive an electrical generator with the turbine.

DETAILED DESCRIPTION

In the following detailed description of exemplary embodiments of the invention, reference is made to the accompanying drawings, which form a part hereof. The detailed description and the drawings illustrate specific exemplary embodiments by which the invention may be practiced. These embodiments are described in sufficient detail to enable those skilled in the art to practice the invention. It is understood that other embodiments may be utilized, and other changes may be made, without departing from the spirit or scope of the present invention. The following detailed description is therefore not to be taken in a limiting sense.

Figure 2:
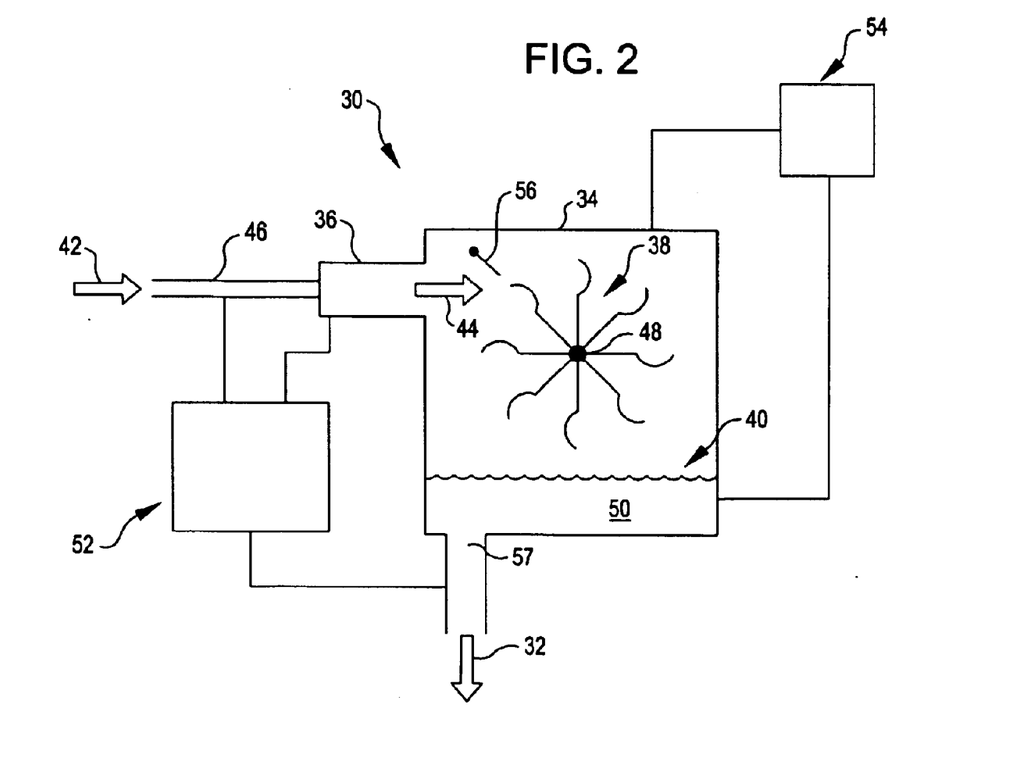
FIG. 2 is a schematic view of a valve for reducing fluid pressure and generating power, according to an embodiment of the invention.

FIG. 2 is a schematic view of a valve 30, according to an embodiment of the invention, for reducing fluid pressure in a fluid distribution network (not shown) and generating power from the pressure removed. To provide a consistent desired reduction in fluid pressure and/or flow rate in the fluid distribution network, the valve 30 generates a valve discharge flow 32 having a pressure and/or flow rate that can be independent of the amount of power generated by the valve 30. That is, the amount of power generated by the valve 30 does not affect the amount of fluid pressure the valve 30 removes from the fluid in the fluid distribution network. Thus, the valve 30 generates a consistent valve discharge flow 32 whether the valve 30 generates power or not.

The valve 30 includes a housing 34, a flow-control device 36 mounted to the housing 34, and a turbine 38 and a fluid reservoir 40 each disposed in the housing 34. The flow-control device 36 converts fluid pressure in the inlet flow 42 into flow velocity in a turbine inlet flow 44 by reducing the cross-sectional area of the inlet flow 42 through which fluid can flow relative to the cross-sectional area of the inlet pipe 46 that is coupled to the valve 30. Thus, the flow-control device 36 restricts the amount of fluid flowing through the valve 30 and generates a turbine inlet flow 44 having a higher ratio of flow velocity to fluid pressure than the inlet flow 42 has. The turbine 38 absorbs kinetic energy from the turbine inlet flow 44 and rotates a shaft 48 that can be coupled to any desired device, such as a conventional generator to generate electrical power. The fluid reservoir 40 collects the flow of fluid discharged from the turbine and uses the mass of the discharged fluid 50 in the reservoir to generate fluid pressure in the valve discharge flow 32. Thus, the valve 30 generates a valve discharge flow 32 having a fluid pressure less than the fluid pressure in the inlet flow 42 by restricting the amount of fluid allowed to flow through the valve 30. And, the valve 30 generates power by converting fluid pressure in the inlet flow 42 into flow velocity in the turbine inlet flow 44 and using the flow 44 to rotate the turbine 38.

The valve 30 may also include a flow-control circuit 52 (discussed in greater detail in conjunction with FIG. 3) for regulating the fluid pressure and/or flow rate of the valve-discharge flow 32. The fluid-control circuit 52 senses the fluid pressure in the flow 32 and uses the fluid pressure in the inlet flow 42 to open and close the flow control device 36. When the fluid pressure in the flow 32 falls below a predetermined value, the fluid pressure in the inlet flow 42 partially or fully opens the flow control device 36. Conversely, when the fluid pressure in the flow 32 rises above a predetermined value, the fluid pressure in the inlet flow 42 partially or fully closes the flow control device 36. Thus, the flow control circuit 52 regulates the amount of fluid flowing through the valve 30 using negative feedback.

The valve 30 may also include a pressure-control circuit 54 (discussed in greater detail in conjunction with FIG. 4) for regulating gas pressure inside the housing 34 of the valve 30. By establishing and maintaining a gas pressure inside the housing 34, the liquid level in the reservoir 40 required to generate a desired fluid pressure in the valve discharge flow 32 can be reduced. Consequently, the size of the valve 30 can be minimized. The pressure-control circuit 54 senses the liquid level in the reservoir 40. When the liquid level falls below a predetermined level, the pressure-control circuit 54 injects gas into the housing 34 to increase the gas pressure inside the housing 34. When the liquid level rises above a predetermined level, the pressure-control circuit 54 removes gas from the housing 34 to decrease the gas pressure inside the housing. Thus, the pressure-control circuit 54 can regulate the fluid pressure and/or flow rate of the valve discharge flow 32 by regulating the gas pressure in the housing 34.

Still referring to FIG. 2, the flow-control device 36 may also include a nozzle to generate the turbine inlet flow 44, and an impulse turbine that includes a turbine runner (discussed in greater detail in conjunction with FIGS. 5A–7B) to absorb the kinetic energy of the turbine inlet flow 44 and rotate the shaft 48. Furthermore, the valve 30 may include a deflector 56 pivotally attached to the housing 34 for regulating the amount of power generated by the valve 30. The amount of power generated by the turbine 38 depends on where the turbine inlet flow 44 strikes the turbine 38 and the angle at which the turbine inlet flow 44 strikes the turbine. When the deflector 56 is positioned out of the path of the turbine inlet flow 44, the flow 44 strikes the turbine unimpeded. When the deflector is positioned in the path of the turbine inlet flow 44, the deflector 56 impedes the turbine inlet flow 44 before it strikes the turbine 38. The deflector may deflect some or all of the turbine inlet flow 44 away from the turbine 38 and/or change the angle at which some or all of the turbine inlet flow 44 strikes the turbine 38. Consequently, the turbine 38 generates more power when the deflector 56 is positioned out of the path of the turbine inlet flow 44 than when the deflector 56 is positioned in the path of the flow 44.

In operation, the flow-control device 36 generates a turbine inlet flow 44 having a relatively high flow velocity and relatively low fluid pressure from the inlet flow 42 which has, a relatively low flow velocity and relatively high fluid pressure. For example, the turbine inlet flow 44 may have a flow velocity of 102 feet per second (ft/s) and a fluid pressure of 100 psi, and the inlet flow 42 may have a flow velocity of 1 ft/s and fluid pressure of 200 psi.

The turbine inlet flow 44 strikes the turbine 38 and causes the turbine to rotate. By rotating, the turbine 38 converts the kinetic energy in the turbine inlet flow 44 to rotation of the shaft 48. The shaft 48 may be coupled to a device such as an electrical generator that converts the rotation of the shaft 48 into electrical power. Thus, the fluid pressure in the inlet flow 42 is converted into flow velocity in the turbine inlet flow 44, which is used to rotate the shaft 48 to generate power. After, the turbine inlet flow 44 strikes the turbine 38, the flow 44 proceeds by gravity or other means to the fluid reservoir 40 where the spent flow is collected. The fluid pressure and flow rate of the valve discharge flow 32 is generated by the fluid pressure of the fluid 50 in the reservoir 40 at the valve outlet 57. Consequently, the desired fluid pressure and/or flow rate in the valve discharge flow 32 may be modified by changing the fluid level in the reservoir 40 and/or changing the gas pressure inside the housing 34. Thus, the valve 30 generates a valve discharge flow 32 having a fluid pressure that is less than the fluid pressure in the inlet flow 42 by restricting the amount of fluid that flows into the fluid reservoir 40 from the inlet flow 42.

In other embodiments, the valve 30 may include at least two flow-control devices 36 each coupled to the same inlet pipe 46. Alternatively, the valve 30 may include at least two flow-control devices 36 each coupled to a different inlet pipe 46. In addition, the valve 30 may include at least two flow-control devices 36 each generating a turbine inlet flow 44 that strikes a single turbine 38. Furthermore, the valve 30 may include at least two turbines 38 disposed in the housing 34. Moreover, the valve 30 may include at least two reservoirs. In addition, the valve 30 may be coupled to at least two outlet pipes for distributing a valve discharge flow to different branches of a fluid distribution network (not shown). Furthermore, the valve 30 may generate two different valve discharge flows 32 at the same time and supply a respective one of the outlet pipes with one of the valve discharge flows.

Figure 3:
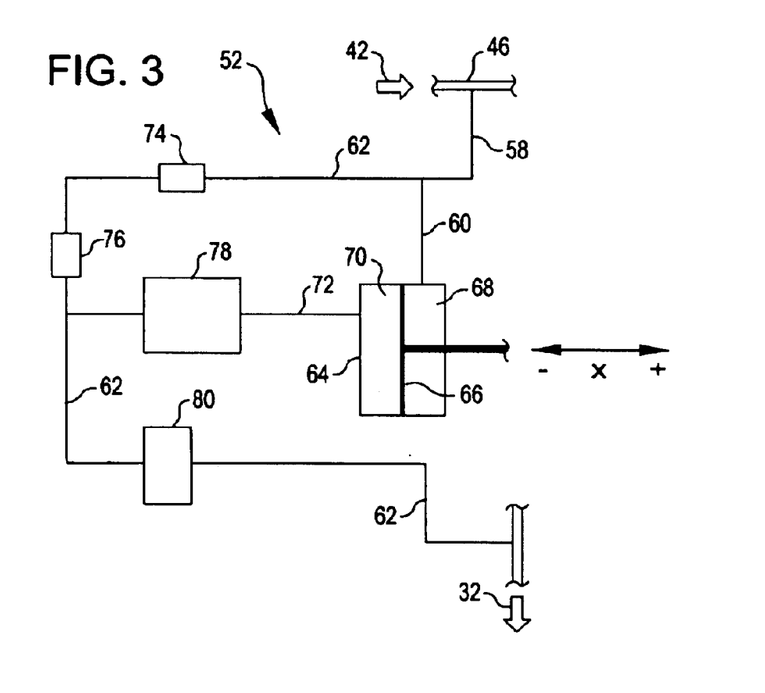
FIG. 3 is a schematic view of a flow-control circuit incorporated in the valve of FIG. 2 according to an embodiment of the invention.

FIG. 3 is a schematic view of the flow-control circuit 52 incorporated in the valve 30 of FIG. 2 according to an embodiment in the invention. The flow-control circuit 52 substantially maintains the desired fluid pressure and/or flow rate in the valve discharge flow 32 by regulating the amount of fluid contained in the turbine inlet flow 44 (FIG. 2). Consequently, when the fluid pressure in the valve discharge flow 32 changes because flow conditions in other portions of the fluid distribution network (not shown) change, the flow-control circuit 52 increases or decreases the amount of fluid flowing in the turbine inlet flow 44 to maintain the desired flow characteristics in the valve discharge flow 32. For example, if the fluid pressure in the valve discharge flow 32 increases, the flow-control circuit 52 closes the flow-control device 36 (FIG. 2) to reduce or stop the flow of fluid through the valve 30. Conversely, when the fluid pressure decreases in the discharge flow 32, the flow-control circuit 52 opens the flow control device 36 to increase the flow of fluid through the valve 30.

The flow-control circuit 52 uses the fluid pressure in the inlet flow 42 (FIG. 2) to open and close the flow-control device 36. The flow-control circuit 52 includes a line 58 coupled to the inlet pipe 46, the line 58 distributes a portion of the inlet flow 42 having an inlet pressure to the other components of the circuit 52, and branches into two lines 60 and 62 before distributing the flow 42 to the circuit's other components. The flow-control circuit 52 also includes a housing 64, a diaphragm 66 coupled to the flow-control device 36 and separating the housing 64 into two chambers 68 and 70. The line 60 is coupled to the chamber 68 and provides a portion of the inlet flow 42 to the chamber 68. Line 72 couples the line 62 to the chamber 70 to provide a portion of the inlet flow 42 to the chamber 68. When the fluid pressure in the chambers 68 and 70 are equal, the diaphragm moves in the +X direction to close the flow-control device 36 because the area of the diaphragm exposed to the chamber 70 is greater than the area exposed to the chamber 68. When the fluid pressure in the chamber 70 is less than the fluid pressure in the chamber 68, the diaphragm moves in the −X direction to open the flow-control device 36.

The increase and decrease of the fluid pressure in the chamber 70 is determined by a portion of the inlet flow 42 flowing through the line 62 and into the valve discharge flow 32. When the valve discharge flow 32 has a less-than-desired fluid pressure, fluid flows through line 62 into the flow 32 causing the fluid pressure in the chamber 70 to decrease. Consequently, the fluid pressure in the chamber 68 causes the diaphragm to move in the −X direction. Conversely, when the valve discharge flow 32 has a fluid pressure exceeding a desired fluid pressure, fluid does not flow, or flows more slowly, through the line 62. Consequently, the fluid pressure in the chamber 70 increases and thus, the diaphragm moves in the +X direction.

Still referring to FIG. 3, the flow-control circuit 52 may include a check valve 74 to prevent the flow of fluid in the line 62 toward the inlet pipe 46, a flow restrictor 76 to reduce the amount of fluid flowing through the lines 62 and 72, a flow-rate control valve 78 to mitigate sudden pressure changes in the circuit 52, and a pressure-reducing valve 80 to reduce the fluid pressure in the line 62 before the fluid enters the valve discharge flow 32. If the fluid pressure in the valve discharge flow 32 exceeds the fluid pressure in the inlet flow 42, the increase in fluid pressure or fluid flowing in the opposite direction in the portion of the network that includes the inlet pipe 46 could damage other components in the network. Therefore, the check valve 74 may help isolate each portion of the network coupled to the valve 30. With the flow restrictor 76, the size of the other components in the flow-control circuit 52 may be reduced and the sensitivity of the other components to the fluid pressure in line 62 may be increased. The flow-rate control valve 78 minimizes fluid "hammers"—sudden increases in fluid pressure—that can be generated by opening and closing the flow control device 36 quickly. Fluid hammers propagating through the fluid distribution network can damage other components of the network, and thus, minimizing them may be desirable. The pressure-reducing valve 80 ensures that the fluid entering the valve discharge flow 32 through the line 62 does not significantly affect the fluid pressure and/or flow rate of the valve discharge flow 32. Furthermore, the valve 80 may be used to change the pressure in the valve discharge flow 32 as desired by adjusting the output pressure of the valve 80.

Although, the flow-control circuit 52 uses fluid from the inlet flow 42 to open and close the flow-control device 36, the circuit 52 may use electricity, compressed gas such as air, or other types of fluid different than the fluid distributed by the distribution network. If the flow-control circuit 52 uses electricity, compressed gas, or other types of fluid, the circuit 52 may include components designed to function with the specific medium used.

Figure 4:
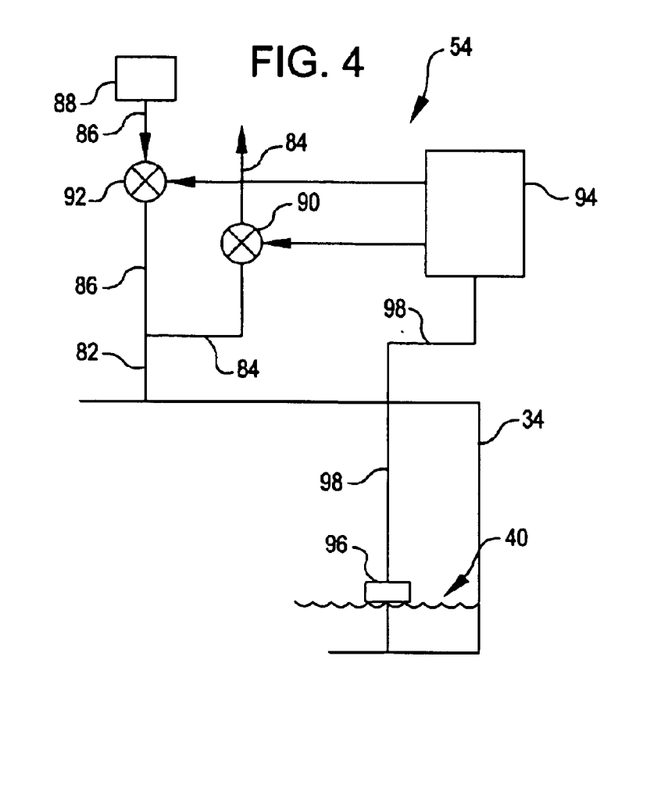
FIG. 4 is a schematic view of a pressure control circuit incorporated in the valve of FIG. 2 according to an embodiment of the invention.

FIG. 4 is a schematic view of the pressure-control circuit 54 of FIG. 2 according to an embodiment of the invention. The pressure-control circuit 54 regulates the gas pressure inside the housing 34 (FIG. 2) of the valve 30 by injecting gas into or releasing gas from the housing 34 as desired. With the housing 34 pressurized, the liquid level in the reservoir 40 required to generate a desired fluid pressure in the valve discharge flow 32 can be reduced. Consequently, the size of the valve 30 can be reduced. Furthermore, the liquid in the reservoir 40 can be used to impede the turbine 38 in FIG. 2 to help reduce the power generated by the valve 30. By reducing the gas pressure in the housing, the level of the liquid in the reservoir 40 may rise to partially or wholly submerge the turbine 38.

The pressure-control circuit 54 includes a line 82 coupled to the housing 34. The line 82 branches into an exhaust line 84 and an injection line 86. The circuit 54 also includes a source of pressurize gas 88 coupled to the injection line 86 for supplying compressed gas to the housing 34, and two valves 90 and 92 each coupled to one of the respective lines 84 and 86. The pressure-control circuit 54 also includes a control module 94 that opens and closes the valves 90 and 92 as required to increase, decrease, or maintain the gas pressure in the housing 34. The pressure-control circuit 54 also includes a float 96 that senses the level of the liquid in the reservoir 40 and a line 98 that conveys the information from the float 96 to the control module 94.

When the liquid level falls below a predetermined level, the control module 94 partially or fully closes the valve 90 if the valve 90 is open and partially or fully opens the valve 92 to inject gas into the housing 34. Thus, the fluid pressure in the valve discharge flow 32 (FIGS. 2 and 3) can be increased to the desired pressure without modifying the flow-control device 36 (FIG. 2) to allow more fluid into the housing 34. When the liquid level rises above a predetermined level or a rise in the liquid level is desired, the control module 94 partially or fully closes the valve 92 if the valve 92 is open and partially or fully opens the valve 90 to remove gas from the housing 34. Thus, the fluid pressure in the valve discharge flow 32 can be decreased to the desired pressure without modifying the flow-control device 36 to reduce the amount of fluid into the housing 34.

Alternatively, the pressure-control circuit 54 may include a manometer or another device for sensing the liquid level instead of the float 96. Or, some of the power generated by the turbine 38 may be used to generate compressed gas in the compressed gas source 88.

Figure 5A:
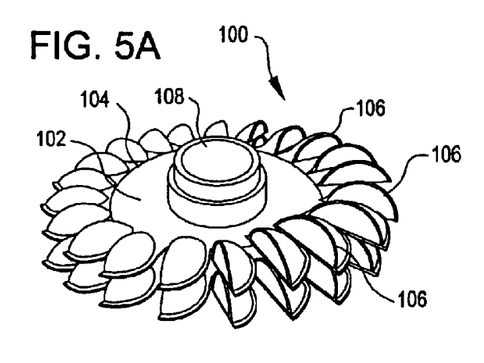
FIG. 5A is a perspective view of a turbine that includes buckets and may be incorporated in the valve of FIG. 2 according to an embodiment of the invention.
Figure 5B:
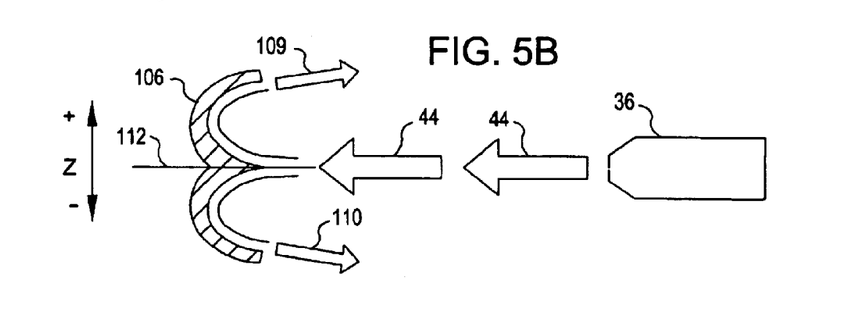
FIG. 5B is a view of a turbine inlet flow striking a bucket of the turbine of FIG. 5A to generate power according to an embodiment of the invention.
Figure 6A:
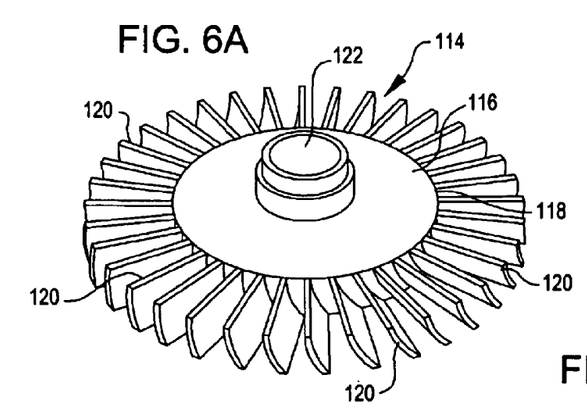
FIG. 6A is a perspective view of a turbine that includes vanes and may be incorporated in the valve of FIG. 2 according to another embodiment of the invention.
Figure 6B:
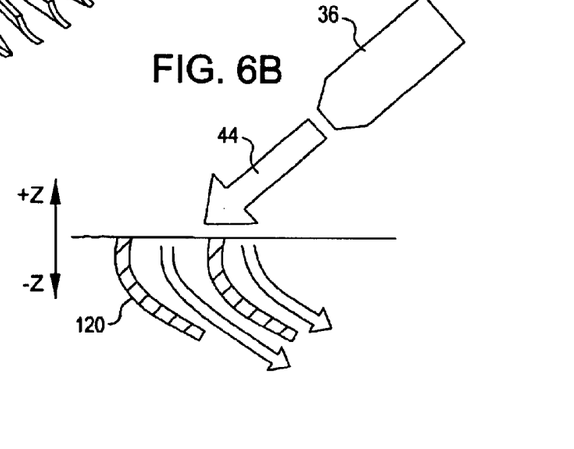
FIG. 6B is a view of a turbine inlet flow striking more than one vane of the turbine of FIG. 6A to generate power according to an embodiment of the invention.
Figure 7A:
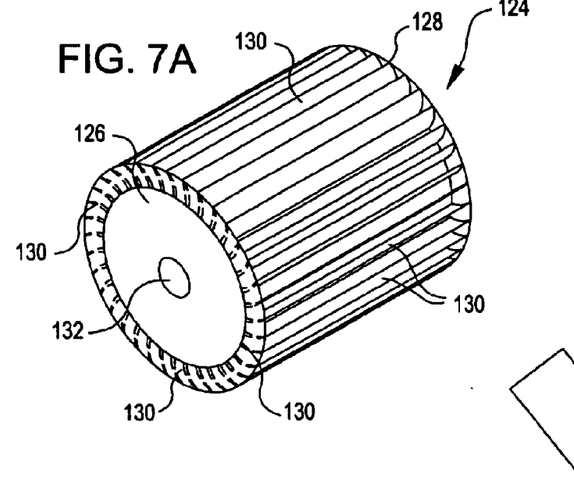
FIG. 7A is a perspective view of another turbine that may be incorporated in the valve of FIG. 2 according to yet another embodiment of the invention.
Figure 7B:
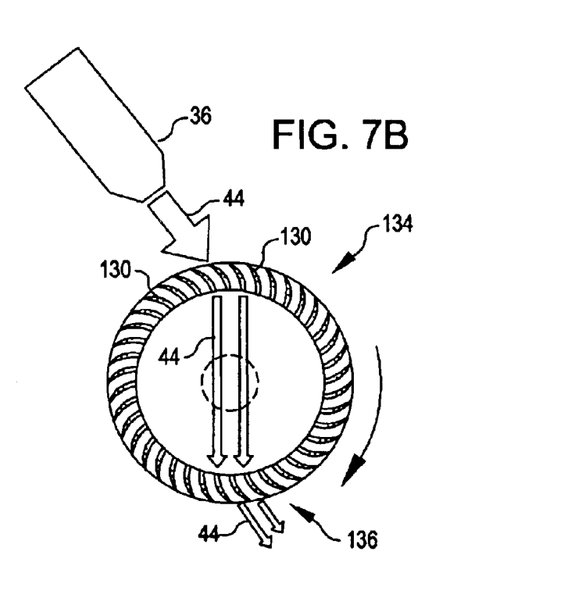
FIG. 7B is a view of a turbine inlet flow striking the turbine of FIG. 7A to generate power according to an embodiment of the invention.

FIGS. 5A–7B illustrate different impulse turbines 38 that the valve 30 (FIG. 2) may incorporate as the turbine 38 (FIG. 2) according to an embodiment of the invention, and illustrate the path of the turbine inlet flow 44 (FIG. 2) as the flow strikes each impulse turbine. FIGS. 5A, 6A and 7A are perspective views of one of the respective impulse turbines, and FIGS. 5B, 6B and 7B are corresponding views of the turbine inlet flow 44 as the flow strikes the impulse turbine shown in one of the respective FIGS. 5A, 6A and 7A. The type of turbine 38 (FIG. 2) incorporated in the valve 30 depends on the desired size of the valve 30 and the desired flow velocity of the turbine inlet flow 44 as described below. Although, each turbine discussed in the following figures is an impulse turbine, the valve 30 may incorporate a reaction-turbine or another type of turbine.

Referring to FIGS. 5A and 5B, in one embodiment, the valve 30 includes a turbine 100 that absorbs the kinetic energy from the turbine inlet flow 44 (FIGS. 2 and 3) and rotates the shaft 48 (FIG. 2) to generate power. The turbine 100 includes a disk 102 having a circumference 104, and a plurality of buckets 106 located on the circumference for deflecting the turbine inlet flow 44. The turbine 100 also includes a center hole 108 to mount the turbine 100 to the shaft 48.

In operation, the turbine 100 uses the force that the turbine inlet flow 44 imparts on the bucket 106 as the bucket changes the direction of the flow 44 to rotate the turbine 100 and thus the shaft 48. The flow-control device 36 generates a turbine inlet flow 44 having a high flow velocity and directs the flow 44 toward the turbine 100. When the turbine inlet flow 44 strikes a bucket 106, the bucket 106 splits the flow 44 into portions 109 and 110 that are each deflected back toward the flow-control device 36. Consequently, each portion 109 and 110 pushes the bucket 106 away from the flow control device 36, causing the disk 102 to rotate. By splitting the turbine inlet flow 44 into two portions 109 and 110, the bucket 106 does not have to counter the force generated by diverting the flow 44 in the +Z or –Z direction.

When the portions 109 and 110 are substantially symmetrical about the bucket axis 112, the force generated by diverting the flow of the portion 109 in the +Z direction is countered by the force generated by diverting the flow of the portion 110 in the –Z direction.

The turbine 100 works well for high-flow velocities, but because the buckets 106 divert the turbine inlet flow 44 back toward the flow-control device 36, the flow 44 is also diverted back toward an adjacent bucket 106. Thus, when the turbine 100 rotates fast, the turbine inlet flow 44 may impede the turbine's rotation. Therefore, the rotational speed of the turbine 100 is typically limited, and the disk 102 frequently has a large diameter. Consequently, the turbine 100 may be used in large valves designed for large reductions in pressure and designed for use with power generation equipment having a designed input shaft speed that is slow to moderate.

Referring to FIGS. 6A and 6B, in another embodiment of the invention, the valve 30 in FIG. 2 includes a turbine 114 that absorbs the kinetic energy from the turbine inlet flow 44 (FIGS. 2 and 3) and rotates the shaft 48 (FIG. 2) to generate power. The turbine 114 includes a disk 116 having a circumference 118, and a plurality of vanes 120 extending radially from the circumference 118 for diverting the turbine inlet flow 44. The turbine 114 also includes a center hole 122 to mount the turbine 114 to the shaft 48. The vanes 120 typically have a smaller profile and may be located closer to each other around the circumference 118 than the buckets 106 (FIGS. 5A and 5B) around the circumference 104. Thus, the turbine 114 may include more vanes 120 than the turbine 100 (FIG. 5A) includes buckets 106. Consequently, the turbine 114 may absorb the kinetic energy of the turbine inlet flow 44 more efficiently.

In operation, the turbine 114 is similar to the turbine 100 (FIGS. 5A and 5B) except that the flow-control device 36 directs the turbine inlet flow 44 toward the vanes 120 at an angle. Thus, the turbine inlet flow 44 generates a force on the turbine 114 in the –Z direction, which the turbine 114 counters. Decreasing the amount of force in the –Z direction countered by the turbine 114 increases the efficiency of the turbine 114. Consequently, the vanes 120 may be designed to direct the turbine inlet flow 44 at an angle that causes the flow 44 to generate a force in the +Z direction when the flow 44 leaves the vanes 120. Thus, the force generated by the turbine inlet flow 44 leaving a vane 120 may balance the force generated by the flow 44 as the flow 44 strikes the turbine 114.

The turbine 114 also works well for high-flow velocities, but because the vanes 120 do not divert the turbine inlet flow 44 back toward an adjacent vane 120, the diverted flow 44 does not impede the turbine's rotation. Thus, the turbine 114 may operate at faster rotational speeds than the turbine 100 of FIGS. 5A and 5B, and the disk 116 may have a smaller diameter than the diameter of the disk 102 of the turbine 100. Consequently, the turbine 114 may be used in small valves designed for large reductions in pressure and designed for use with power-generation equipment having a designed input shaft speed that is high.

Referring to FIGS. 7A and 7B, in yet another embodiment of the invention, the valve 30 in FIG. 2 may include a turbine 124 that absorbs the kinetic energy from the turbine inlet flow 44 (FIGS. 2 and 3) and rotates the shaft 48 (FIG. 2) to generate power. The turbine 124 includes first and second disks 126 and 128 spaced apart from each other, and a plurality of vanes 130 extending between the disks 126 and 128 for diverting the turbine inlet flow 44. Each disk 126 and 128 also includes a center hole 132 (only one shown) to mount the turbine 124 to the shaft 48.

In operation, the turbine 124 is similar to the turbines 100 (FIGS. 5A and 5B) and 114 (FIGS. 6A and 6B) except the turbine inlet flow 44 strikes the turbine 124 twice to rotate the shaft 48 before the flow 44 reaches the valve's reservoir 40 (FIGS. 2 and 4). The turbine inlet flow 44 first strikes the vanes 130 of the upper portion 134 of the turbine 124 similar to the flow 44 striking the turbine 114. Then, the turbine inlet flow 44 passes between the disks 126 and 128 and strikes the vanes 130 of the lower portion 136. Because the turbine inlet flow 44 strikes the turbine in more than one location, the turbine may efficiently absorb much of the kinetic energy of a flow 44 having a low to moderate flow velocity.

Thus, the turbine 124 works well for low to moderate flow velocities and may be used in small valves designed for small reductions in pressure and designed for use with power generation equipment having a designed input shaft speed that is slow to moderate.

Figure 8:
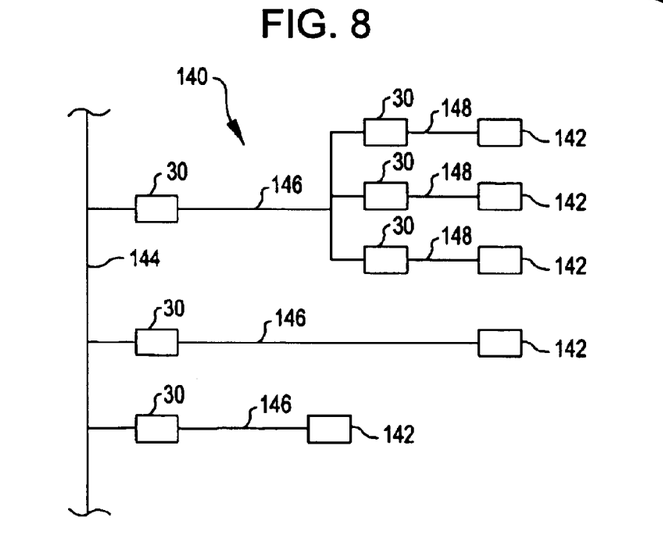
FIG. 8 is a schematic view of a fluid distribution network that incorporates the valve of FIG. 2 according to an embodiment of the invention.

FIG. 8 is a schematic view of a fluid distribution network 140 that incorporates the valve 30 of FIG. 2 according to an embodiment of the invention. The network 140 distributes fluid having a fluid pressure to remote locations 142 from a central reservoir (not shown). The network 140 includes a main transmission line 144 for conveying fluid having a first fluid pressure, a secondary transmission line 146 for conveying fluid having a second fluid pressure that is less than the first fluid pressure, and a distribution line 148 for conveying fluid having a third fluid pressure that is less than the second fluid pressure. The network 140 also includes valves 30 for reducing fluid pressure in the network 140 and generating power from the pressure removed. Some of the valves 30 are each coupled to the main transmission line 144 and one of the respective secondary transmission lines 144 to reduce the first fluid pressure in the main line 144 to the second fluid pressure in the secondary lines 146. Other valves 30 are each coupled to a secondary transmission line 146 and one of the respective distribution lines 148 to reduce the second fluid pressure in the line 146 to the third fluid pressure in the distribution line 148. Thus, the network 140 provides fluid having a third fluid pressure to the remote locations 142 that are coupled to the distribution line 148, and provides fluid having a second fluid pressure to the remote locations 142 that are coupled to the secondary transmission lines 146.

What is claimed is:

1. A valve for reducing fluid pressure and generating power, the valve comprising:
   a housing;
   a flow-control device mounted to the housing and operable to generate a turbine inlet flow having a flow velocity from an inlet flow having a fluid pressure;
   a turbine disposed within the housing and operable to receive the turbine inlet flow and rotate to generate power;
   a valve outlet operable to discharge fluid having a fluid pressure lower than the fluid pressure of the inlet flow; and
   a flow-control circuit operable to sense the discharged flow from the valve outlet and in response regulate the flow of fluid that the valve outlet discharges.

2. The valve of claim 1 wherein the fluid pressure of the discharged fluid is independent of the amount of power generated from the turbine.

3. The valve of claim 1 wherein the valve includes a flow-control device operable to generate a turbine inlet flow having a cross-sectional area that is less than a cross-sectional area of the inlet flow.

4. The valve of claim 1 wherein the flow control device includes a nozzle operable to generate the turbine inlet flow.

5. The valve of claim 1 wherein:
   the flow control device includes a nozzle operable to generate the turbine inlet flow; and
   the turbine includes a disk having a circumference, a plurality of buckets located on the circumference operable to divert the turbine inlet flow, and a shaft coupled to the disk.

6. The valve of claim 1 wherein:
   the flow control device includes a nozzle operable to generate the turbine inlet flow; and
   the turbine includes a disk having a circumference, a plurality of vanes radially protruding from the circumference operable to divert the turbine inlet flow, and a shaft coupled to the disk.

7. The valve of claim 1 wherein:
   the flow control device includes a nozzle operable to generate the turbine inlet flow; and
   the turbine includes first and second disks spaced apart from each other and a plurality of vanes extending between the disks operable to divert the turbine inlet flow, and a shaft coupled to at least one of the disks.

8. The valve of claim 1 further comprising a fluid reservoir operable to collect the turbine inlet flow after the flow is discharged from the turbine and operable to generate a valve discharge flow having a fluid pressure that is less than the fluid pressure of the inlet flow.

9. The valve of claim 8 wherein the fluid reservoir is disposed in the housing.

10. The valve of claim 8 wherein the fluid pressure of the valve discharge flow is generated by the weight of fluid contained in the fluid reservoir.

11. The valve of claim 1 further comprising a deflector plate operable to regulate the rotational speed of the turbine.

12. The valve of claim 11 wherein the deflector plate is pivotally attached to the housing and operable to divert the turbine inlet flow before the flow reaches the turbine.

13. The valve of claim 1 wherein the flow-control circuit senses the fluid pressure of the fluid discharged from the valve, compares the sensed fluid pressure with a desired fluid pressure and directs the flow-control device to maintain the fluid pressure of the discharged fluid at a desired value.

14. The valve of claim 13 wherein the flow-control circuit uses the inlet flow to direct the flow-control device to maintain the fluid pressure of the discharged fluid at the desired value.

15. The valve of claim 13 wherein the flow-control circuit uses the inlet flow to direct the flow control device to modify the turbine inlet flow, and includes a housing and a diaphragm disposed in the housing that separates the housing into two chambers, wherein the inlet flow pressurizes each chamber and a portion of the inlet flow flows through the control circuit to reduce the pressure in one of the chambers to open the flow-control device.

16. The valve of claim 1 further comprising a pressure control circuit operable to increase and decrease gas pressure in the housing.

17. The valve of claim 1 further comprising a generator coupled to the turbine and operable to generate power.

18. A fluid distribution network comprising:
   a first conduit operable to distribute fluid having a first pressure;
   a second conduit operable to distribute fluid having a second pressure that is less than the first pressure; and
   a valve that is operable to reduce fluid pressure and generate power, and that includes:

a housing;

a flow-control device mounted to the housing and operable to generate a turbine inlet flow having a flow velocity from fluid in the first conduit;

a turbine disposed within the housing and operable to receive the turbine inlet flow and rotate to generate power;

a valve outlet operable to discharge fluid having a fluid pressure lower than the fluid pressure of the inlet flow; and a flow-control circuit operable to sense the discharged flow from the valve outlet and in response regulate the flow of fluid that the valve outlet discharges.

19. The network of claim 18 wherein the network includes at least two first conduits and the valve couples the first conduits with the second conduit.

20. The network of claim 18 wherein the network includes at least two second conduits and the valve couples the second conduits with the first conduits.

21. The network of claim 18 wherein the network includes at least two valves that couple the first and second conduits.

22. A method of reducing pressure in a flow of fluid and generating power, the method comprising:

generating, with a flow control device, a turbine inlet flow having a flow velocity from an inlet flow having a first pressure;

projecting the turbine inlet flow toward a turbine disposed in a housing;

diverting the turbine inlet flow with the turbine to rotate the turbine;

generating a valve discharge flow having a desired second pressure that is less than the first pressure; and sensing the valve discharge flow generated and in response regulating the valve discharge flow being generated.

23. The method of claim 22 wherein generating the turbine inlet flow includes forcing the inlet flow through a nozzle to generate a turbine inlet flow having a high flow velocity.

24. The method of claim 22 wherein projecting the turbine inlet flow toward a turbine includes projecting the turbine inlet flow between two disks of the turbine.

25. The method of claim 22 wherein diverting the turbine inlet flow includes diverting the turbine inlet flow with a deflection plate before the turbine inlet flow reaches the turbine.

26. The method of claim 22 wherein diverting the turbine inlet flow includes diverting the turbine inlet flow two or more times with the turbine before the turbine inlet flow is collected in the reservoir.

27. The method of claim 22 further comprising collecting the flow discharged from the turbine in a reservoir.

28. The method of claim 22 further comprising generating power from the turbine.

29. The method of claim 22 wherein:

sensing the valve discharge flow includes sensing the pressure in the valve discharge flow; and regulating the valve discharge flow includes directing the flow-control device to maintain the fluid pressure of the discharged fluid at a desired value.

30. The method of claim 22 further comprising injecting gas into the housing to increase the second pressure.

31. The method of claim 22 further comprising removing gas from the housing to decrease the second pressure.

32. A method, comprising:

converting energy from an input fluid flow having a first pressure into mechanical work;

generating an output fluid flow having a second pressure that is less than the first pressure; and maintaining the second pressure at a desired level by adjusting the input fluid flow in response to the output fluid flow.

33. The method of claim 32 wherein converting energy from the input fluid flow comprises diverting the input fluid flow with a turbine.

34. The method of claim 32 wherein converting energy from the input fluid flow comprises rotating a shaft of an electrical generator with the input fluid flow.

35. The method of claim 32 wherein generating an output fluid flow having a second pressure comprises maintaining the output fluid flow at the second pressure by adjusting the pressure of a gas within a housing that receives the input fluid flow and that expels the output fluid flow.

36. A valve for reducing fluid pressure and generating power, the valve comprising:

a housing;

a flow-control device mounted to the housing and operable to generate a turbine inlet flow having a flow velocity from an inlet flow having a fluid pressure;

a turbine disposed within the housing and operable to receive the turbine inlet flow and rotate to generate power;

a valve outlet operable to discharge fluid having a fluid pressure lower than the fluid pressure of the inlet flow; and a pressure control circuit operable to increase and decrease gas pressure in the housing.

37. The valve of claim 36 wherein the pressure control circuit is operable to increase and decrease gas pressure in the housing to control the rotational speed of the turbine.

38. The valve of claim 36 further comprising a fluid reservoir operable to collect the turbine inlet flow after the flow is discharged from the turbine and operable to generate a valve discharge flow having a fluid pressure that is less than the fluid pressure of the inlet flow.

39. The valve of claim 38 wherein the pressure control circuit adjusts the level of liquid collected in the reservoir to partially submerge the turbine with the liquid.

40. The valve of claim 38 wherein the pressure control circuit adjusts the level of liquid collected in the reservoir to wholly submerge the turbine with the liquid.

41. The valve of claim 38 wherein the fluid pressure of the valve discharge flow is generated by the weight of the liquid contained in the fluid reservoir and the gas pressure in the housing.

42. The valve of claim 38 wherein the pressure control circuit includes a float operable to sense the level of liquid contained in the fluid reservoir, and a control module operable to open a valve to inject gas into the housing and to close a valve to stop injecting gas into the housing.

43. A fluid distribution network comprising:

a first conduit operable to distribute fluid having a first pressure;

a second conduit operable to distribute fluid having a second pressure that is less than the first pressure; and a valve that is operable to reduce fluid pressure and generate power, and that includes:

a housing;

a flow-control device mounted to the housing and operable to generate a turbine inlet flow having a flow velocity from fluid in the first conduit;

a turbine disposed within the housing and operable to receive the turbine inlet flow and rotate to generate power;

a valve outlet operable to discharge fluid having a fluid pressure lower than the fluid pressure of the inlet flow; and a pressure control circuit operable to increase and decrease gas pressure in the housing.

44. A method of reducing pressure in a flow of fluid and generating power, the method comprising:

generating, with a flow control device, a turbine inlet flow having a flow velocity from an inlet flow having a first pressure;

projecting the turbine inlet flow toward a turbine disposed in a housing;

diverting the turbine inlet flow with the turbine to rotate the turbine;

generating a valve discharge flow having a desired second pressure that is less than the first pressure; and injecting gas into the housing to increase the second pressure.

45. The method of claim 44 further comprising collecting the flow discharged from the turbine in a reservoir.

46. The method of claim 45 further comprising:

sensing the level of fluid in the reservoir; and injecting gas into the housing to increase the second pressure when the level of fluid is less than a desired level.

47. A method of reducing pressure in a flow of fluid and generating power, the method comprising:

generating, with a flow control device, a turbine inlet flow having a flow velocity from an inlet flow having a first pressure;

projecting the turbine inlet flow toward a turbine disposed in a housing;

diverting the turbine inlet flow with the turbine to rotate the turbine;

generating a valve discharge flow having a desired second pressure that is less than the first pressure; and removing gas from the housing to decrease the second pressure.

48. The method of claim 47 further comprising collecting the flow discharged from the turbine in a reservoir.

49. The method of claim 48 further comprising:

sensing the level of fluid in the reservoir; and removing gas from the housing to decrease the second pressure when the level of fluid is greater than a desired level.

* * * * *